(No Model.)
C. E. PARKS.
COMPOUND LUMBER.
No. 509,180. Patented Nov. 21, 1893.
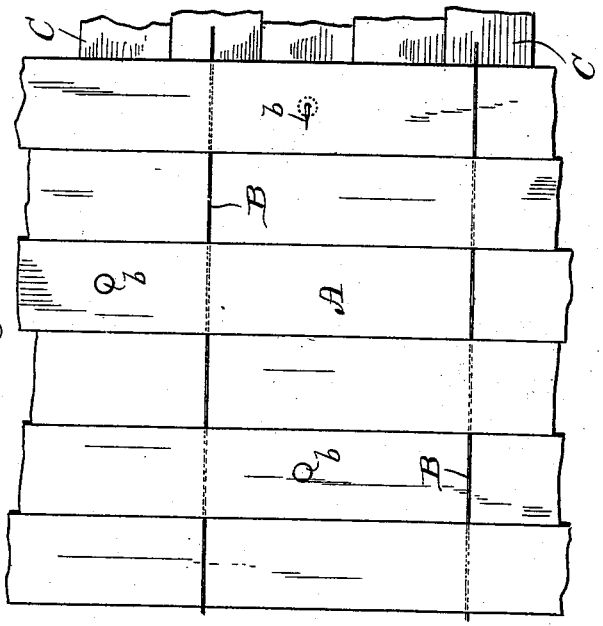
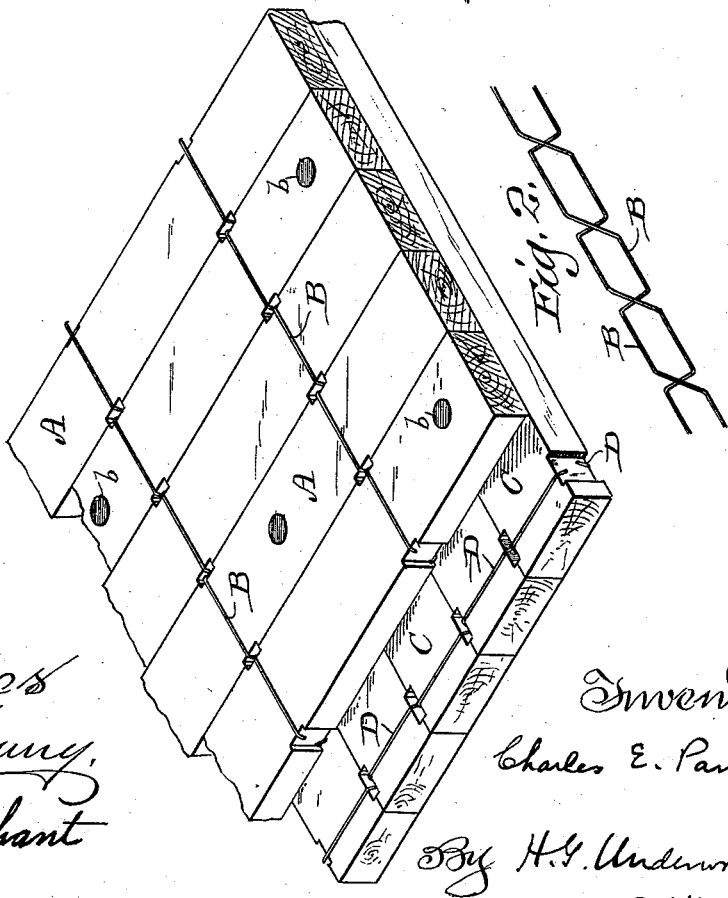
Witnesses
Geo. W. Young,
N. E. Oliphant
Inventor
Charles E. Parks
By H. G. Underwood
Attorneys

UNITED STATES PATENT OFFICE.

CHARLES E. PARKS, OF WATERTOWN, WISCONSIN.

COMPOUND LUMBER.

SPECIFICATION forming part of Letters Patent No. 509,180, dated November 21, 1893.

Application filed February 7, 1893. Serial No. 461,312. (No model.)

*To all whom it may concern:*

Be it known that I, CHARLES E. PARKS, a citizen of the United States, and a resident of Watertown, in the county of Jefferson, and in the State of Wisconsin, have invented certain new and useful Improvements in Compound Lumber; and I do hereby declare that the following is a full, clear, and exact description thereof.

My invention has for its principal object to utilize and make merchantable a vast amount of what is now saw-mill refuse ordinarily consumed by fire to prevent accumulation about the mills; and said invention consists in a compound lumber hereinafter described with reference to the accompanying drawings and subsequently claimed.

In the drawings: Figure 1 represents a perspective view of a section of compound lumber made according to my invention; Fig. 2, a similar view of warp-strands employed in one form of fabric necessary to the construction of the lumber, and Fig. 3, a plan view of a section of said lumber having the layers thereof woven in a different manner from those shown in Fig. 1.

Referring by letter to the drawings A represents a series of wooden slats forming the weft of a fabric having a warp B of flexible material, preferably wire. The fabric thus formed constitutes one layer of my compound lumber and is joined to another similar layer by nails *b* or other suitable means, the slats C and flexible material D of the latter layer being at an angle, right or otherwise, to like parts in the former layer to thereby strengthen the compound material as well as to prevent warping of the slats in either layer. It is to be understood that I prefer to unite the layers of fabric by nails or analogous devices in preference to using adhesive material such as glue for the same purpose. Ordinarily the two united layers of the peculiar fabric will give a sufficient thickness of the compound material for various purposes, but it is obvious that the layers may be indefinitely multiplied to obtain a greater thickness, and in such a case it will be preferable to have the component parts of each layer at an angle to like parts in the layer or layers next adjacent.

The weaving of the fabric, necessary to the layers of the compound lumber, may vary according to the use for which said lumber is required. In some cases the warp-strands of the fabric will be single, as shown in Fig. 3 but in other cases they will run in pairs and be manipulated to cross each other and come on opposite sides of each slat, as shown in Figs. 1 and 2. In order that the slats in the fabric may abut one against another when double warp-strands are employed, I notch said slats where said strands cross each other, as shown in Fig. 1.

As a matter of economy in the manufacture of my compound lumber, I prefer to utilize the saw-mill edgings that are ordinarily burned for want of merchantable value, and to this end I saw said material into narrow strips or slats, cut the product into convenient lengths and weave the same with flexible strands into the fabric above specified, after which I cut this fabric into sections of predetermined length and unite two or more of them in the manner previously set forth. The compound lumber thus produced is of great strength and may be employed for stove-board linings, box-making, house partitions and various other purposes.

Having thus described my invention, what I claim as new, and desire to secure by Letters Patent, is—

1. A compound lumber consisting of united layers of fabric made from wooden slats interwove with flexible strands, the component parts of one layer being at an angle to like parts in a companion layer, substantially as set forth.

2. A compound lumber consisting of layers of fabric made from wooden slats interwove with flexible strands, the component parts of one layer being at an angle to like parts in a companion layer, and nails or analogous devices uniting said layers, substantially as set forth.

3. A compound lumber consisting of united layers of interwove slat-and-wire fabric crossed one upon the other, substantially as set forth.

4. A method of utilizing saw-mill edgings, that consists in cutting the same into slats of convenient length, interweaving the product with flexible strands, crossing sections of the woven material one upon another, and rigidly uniting these sections, substantially as set forth.

In testimony that I claim the foregoing I have hereunto set my hand, at Milwaukee, in the county of Milwaukee and State of Wisconsin, in the presence of two witnesses.

CHARLES E. PARKS.

Witnesses:
N. E. OLIPHANT,
H. G. UNDERWOOD.